United States Patent
Tanahashi et al.

(10) Patent No.: US 7,152,017 B2
(45) Date of Patent: Dec. 19, 2006

(54) NUMERICAL ANALYSIS SYSTEM USING HYBRID GRID ADAPTATION METHOD

(75) Inventors: Takahiko Tanahashi, Yokohama (JP); Tomohiko Jimbo, Yokohama (JP)

(73) Assignee: Keio University, Tokyo (JP)

( * ) Notice: Subject to any disclaimer, the term of this patent is extended or adjusted under 35 U.S.C. 154(b) by 64 days.

(21) Appl. No.: 10/613,932

(22) Filed: Jul. 1, 2003

(65) Prior Publication Data

US 2004/0138853 A1   Jul. 15, 2004

(30) Foreign Application Priority Data

Jul. 4, 2002   (JP) .............................. 2002-195688

(51) Int. Cl.
*G06F 11/30* (2006.01)

(52) U.S. Cl. ...................... 702/183; 702/179; 702/127; 702/50; 703/2; 703/6; 703/9; 382/107; 382/108; 382/109; 716/20; 716/21; 356/2; 356/3.01

(58) Field of Classification Search .................. 702/50, 702/127, 137–138, 147, 179, 189, 183; 716/20, 716/21; 382/107–109; 356/2, 3.01; 703/2, 703/6, 9, 147

See application file for complete search history.

(56) References Cited

U.S. PATENT DOCUMENTS 6,512,999 B1 * 1/2003 Dimas et al. .................. 703/9
6,882,954 B1 * 4/2005 Shimizu et al. ............. 702/150

OTHER PUBLICATIONS

Ham et al., 'A Cartesian Grid Method with Transient Anisotropic Adaptation', Feb. 12, 2002, JOCP, vol.: 179, pp. 469-494.*

Wang et al., 'A 2N Tree Based Automated Viscous Gartesian Grid Methodology for Feature Capturing', Jan. 1999, AIAA, pp. 1-11.*

Yee et al., 'Conformal Hybrid Finite Difference Time Domain and Finaite Volume', Oct. 1994, IEEE Article, vol.: 42, No. 10, pp. 1450-1455.*

Minyard et al., 'Partitioning and Dynamic Load Balancing of Adaptive Hybrid Grids for Large-Scale Turbulent Flow Simulations', Jan. 1996, IEEE Article, pp. 575-584.*

(Continued)

*Primary Examiner*—Patrick Assouad
*Assistant Examiner*—Elias Desta
(74) *Attorney, Agent, or Firm*—Dellett & Walters

(57) ABSTRACT

The numerical analysis system of the invention analyzes the dynamical state of the compressible fluid employing Hybrid Grid Adaptation Method by Finite Volume Method. The initial grid data are created by way of free combination of tetrahedral cells, hexahedral cells and pentahedral cells. The divide-delete index is calculated according to the density of the fluid in each cell. A triangular face of the cell is divided into triangular faces and the quadrilateral face is divided into quadrilateral faces when the cell is divided. The cell is divided only when three conditions are satisfied. The first condition is that the volume of the cell is greater than the minimum volume. The second is that the dividing level of the cell is not the maximum level. The third is that the divide-delete index is greater than the dividing threshold. The cell is recovered to the former undivided cell by deleting and merging divided cells when the cell is not the initial cell and the divide-delete index is less than the deleting threshold. As the freedom of the grid creation is high, the suitable cells are easily created and the calculation efficiency becomes high.

13 Claims, 16 Drawing Sheets

OTHER PUBLICATIONS

Clark et al., 'Stationary, Non Stationary, and Hybrid Interactive Method of Moments Solution Scheme', Oct. 2001, IEEE Article, vol.: 49, No. 10, pp. 1462-1469.*

Kaup, 'Object-Based Texture Coding of Moving Video in MPEG-4', Feb. 1999, vol.: 9 No. 1, pp. 5-15.*

Weiler et al., 'Hardware-Software-Balance Re-Sampling for the Interactive Visualization of Unstructred Grids', Jan. 2001, IEEE Article, pp. 199-206.*

* cited by examiner

Figure 3.
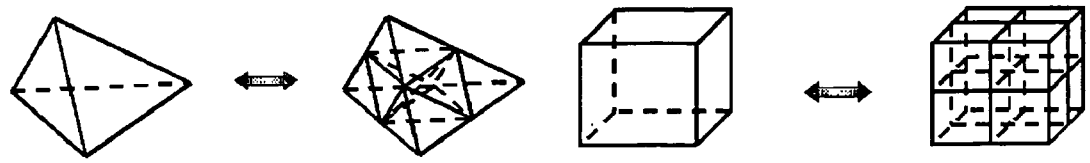
(a) Tetrahedron:8    (b) Hexahedron:8
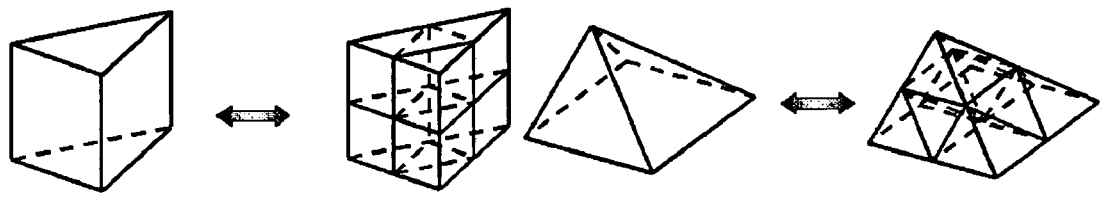
(c) Prism:8    (d) Pyramid:6, Tetrahedron:4
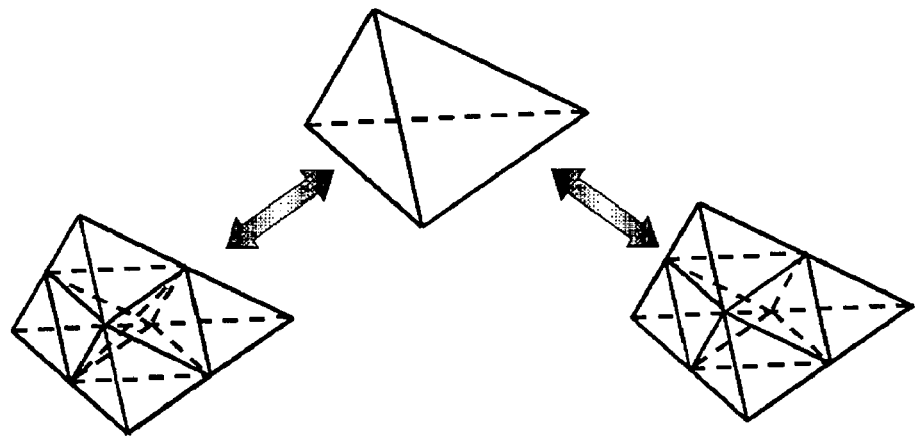
Tetrahedron:8
(Type 1)
Tetrahedron:4, Pyramid:2
(Type 2)
|  | Level 0 | Level 1 | Level 2 | Level 3 | Level 4 |
|---|---|---|---|---|---|
| Tetrahedron:8 (Type 1) | 1 | 8 | 64 | 512 | 4096 |
| Tetrahedron:4 Pyramid:2 (Type 2) | 1 | 6 | 44 | 328 | 2448 |
(e) Division by 6 of tetrahdron

Figure 4.

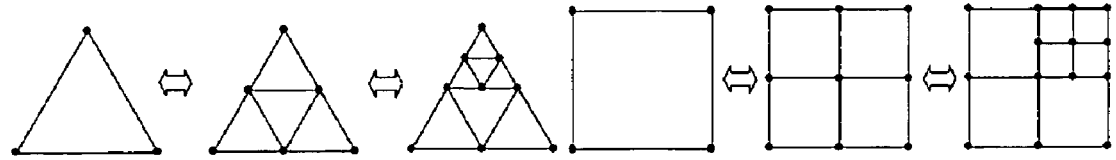

(a) Triangle    (b) Quadrilateral

Refining and coarsening of boundary surface of grid

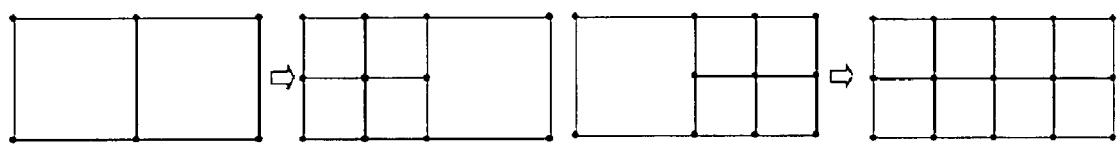

(c) Difference of grid level=0    (d) difference of grid level=1

Differnce of grid level (refining)

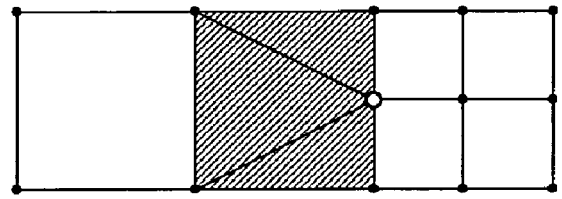

(e) Hanging node and Temporary grid (2D, quarilateral grid)

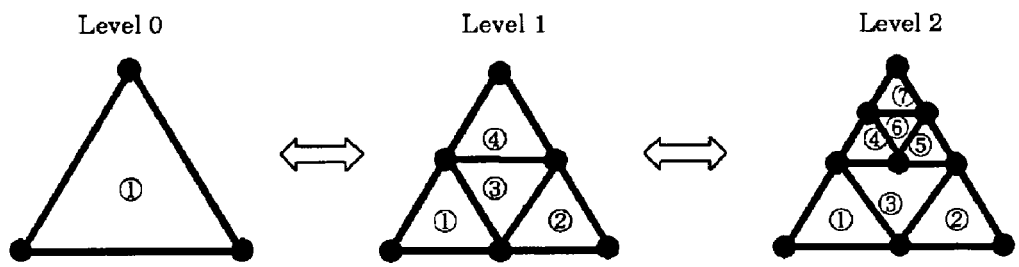

Level 0    Level 1    Level 2

| | | |
|---|---|---|
| cp[1]->parent[0] = ① | cp[1]->parent[1] = ① | cp[4]->parent[2] = ④ |
| cp[1]->brother[0] = 0 | cp[1]->brother[1] = ② | cp[4]->brother[2] = ⑤ |
| | cp[2]->parent[1] = ① | cp[5]->parent[2] = ④ |
| | cp[2]-> brother[1] = ③ | cp[5]->brother[2] = ⑥ |
| | cp[3]->parent[1] = ① | cp[6]->parent[2] = ④ |
| | cp[3]-> brother[1] = ④ | cp[6]->brother[2] = ⑦ |
| | cp[4]->parent[1] = ① | cp[7]->parent[2] = ④ |
| | cp[4]-> brother[1] = ① | cp[7]->brother[2] = ④ |

(f) Family Relation (a)

(b)

Figure 6.
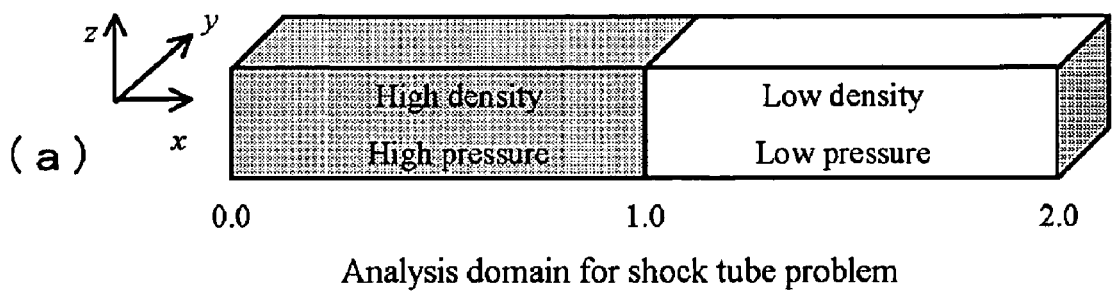
(a) Analysis domain for shock tube problem
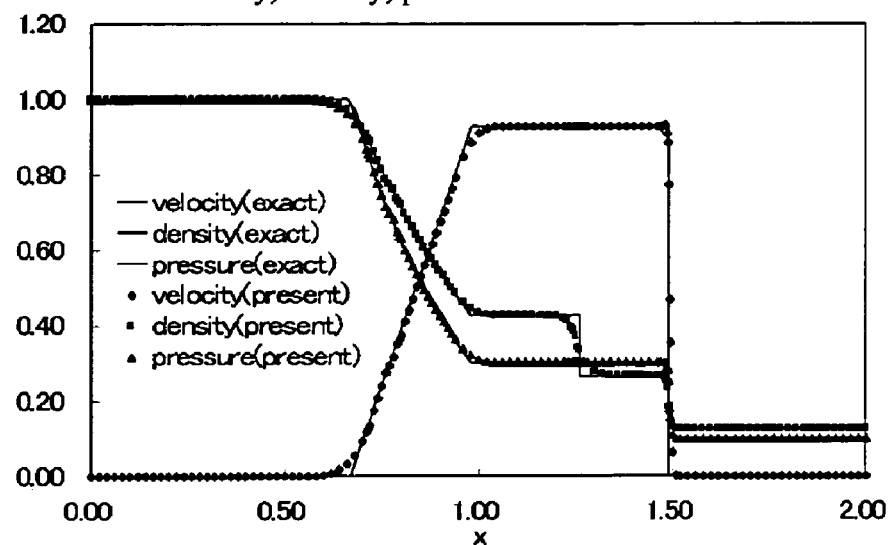
(b) Velocity, density, pressure distributions
(c)
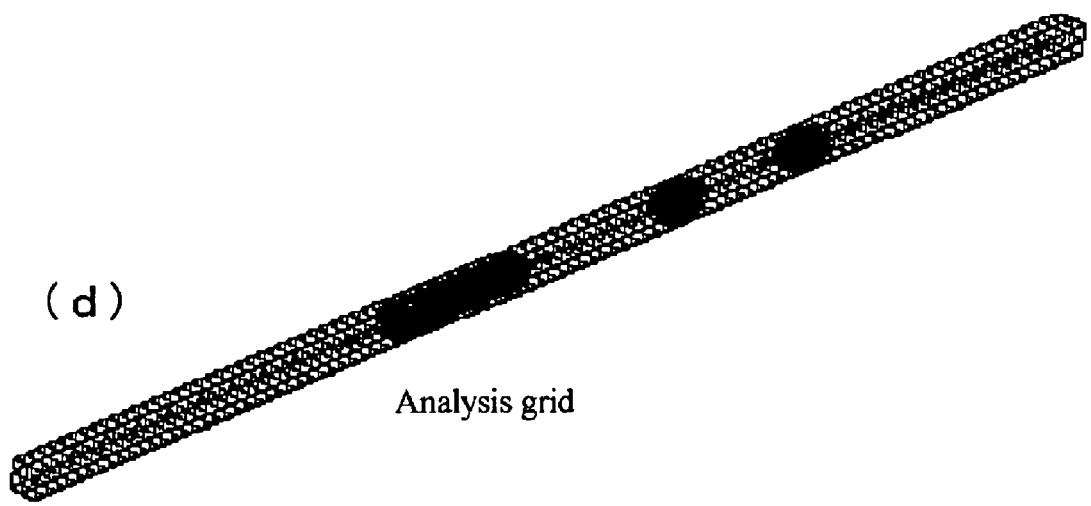
(d) Analysis grid Figure 7.
(a) 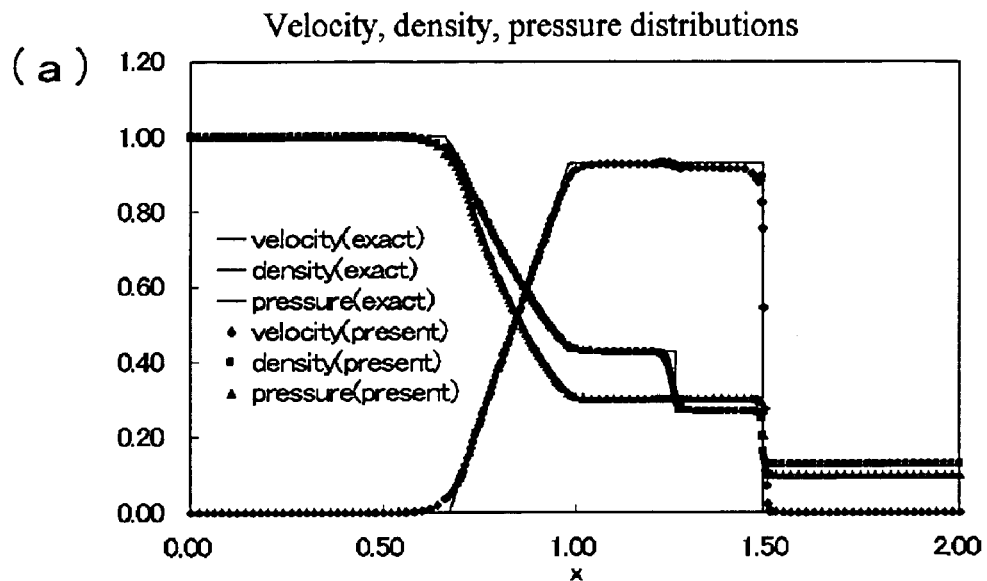
(b) 
(c) 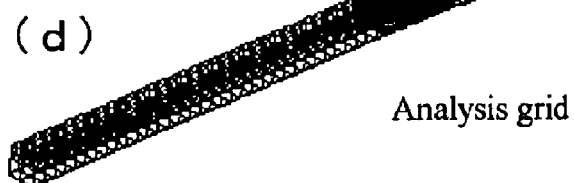
(d) 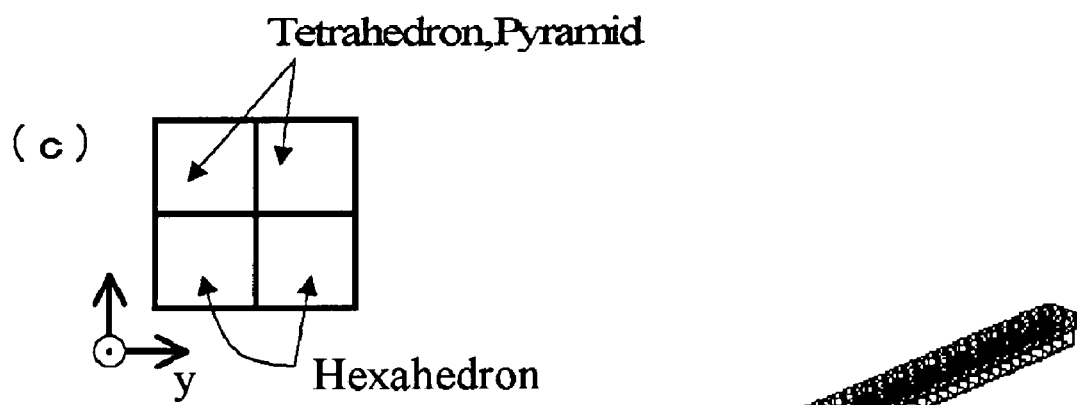
Analysis grid Figure 8.
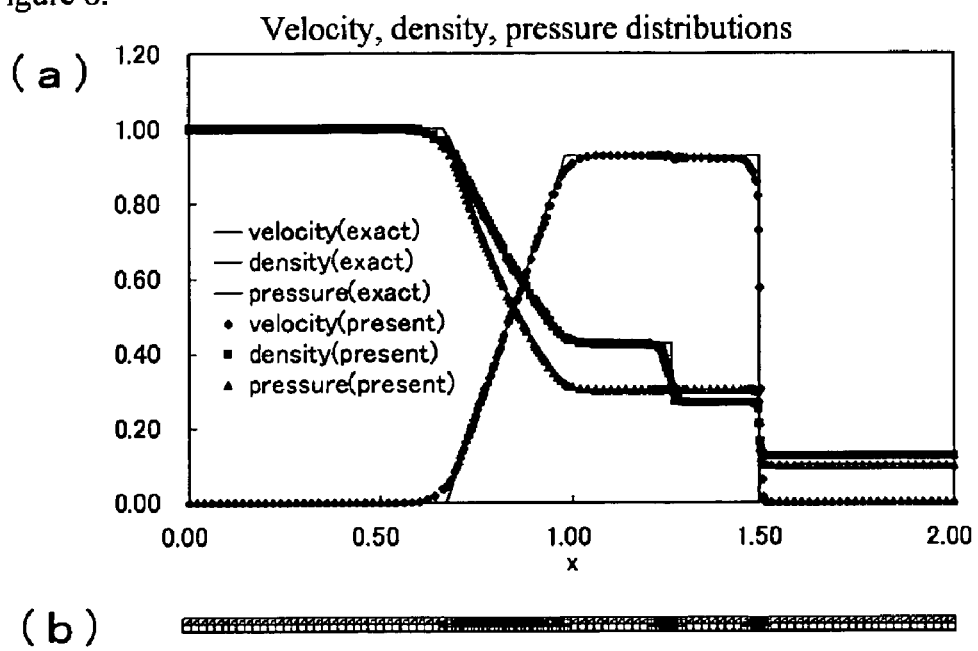
(a)
(b)
(c) Tetrahedron, Pyramid
Tetrahedron
Pyramid
Hexahedron
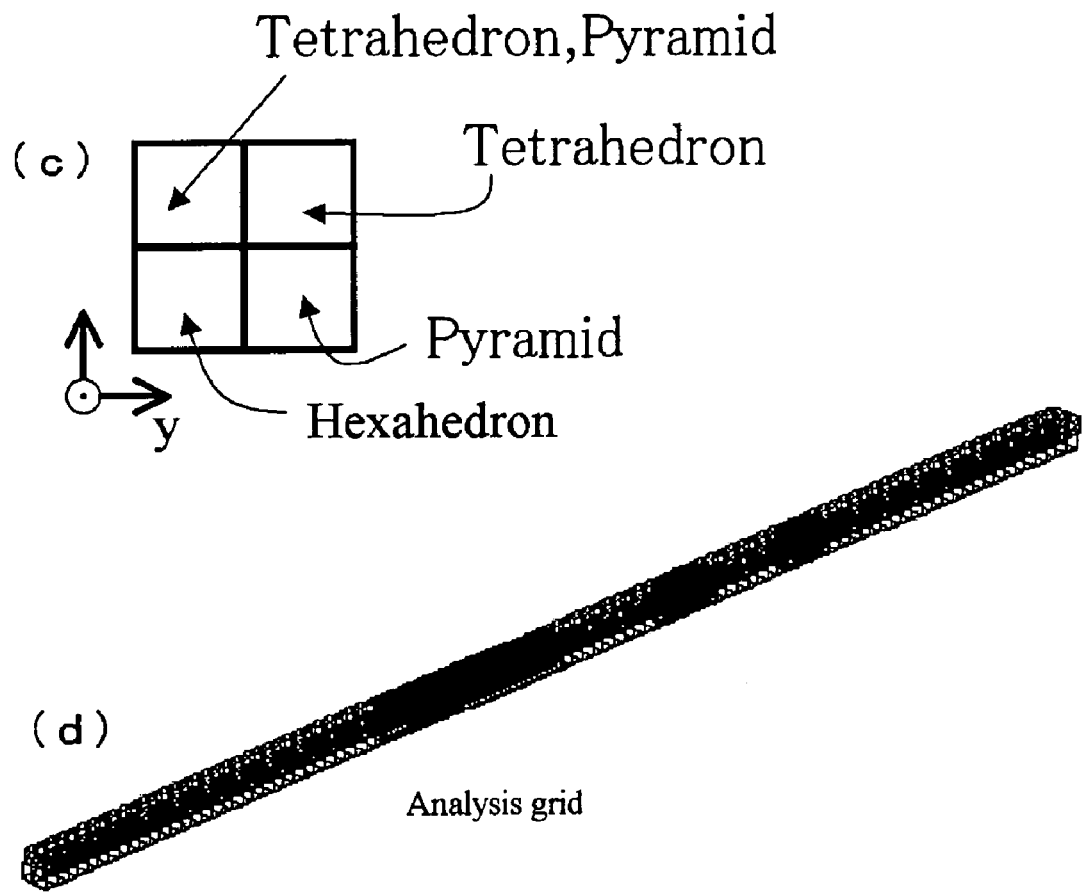
(d) Analysis grid Figure 9.
(a)
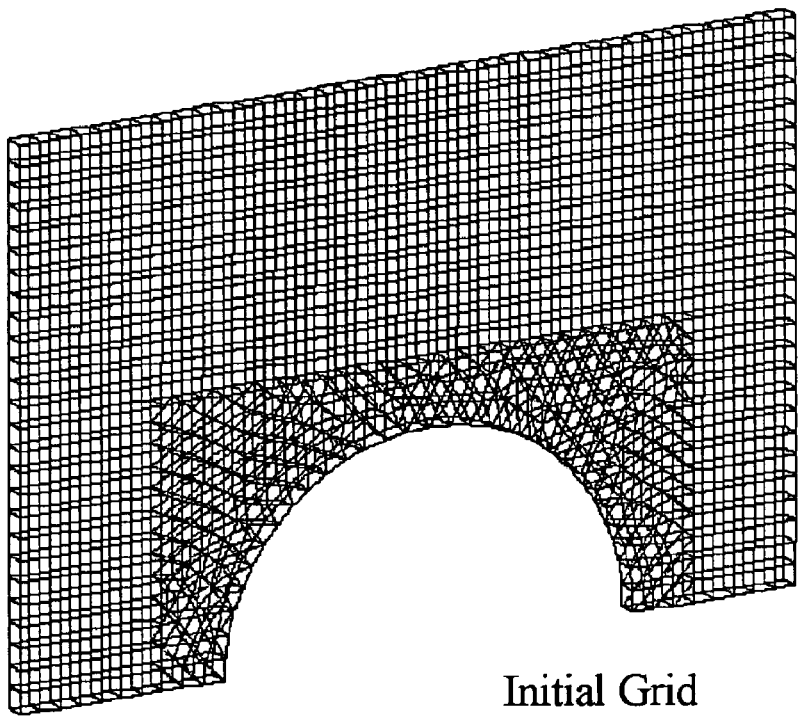
Initial Grid
(b)
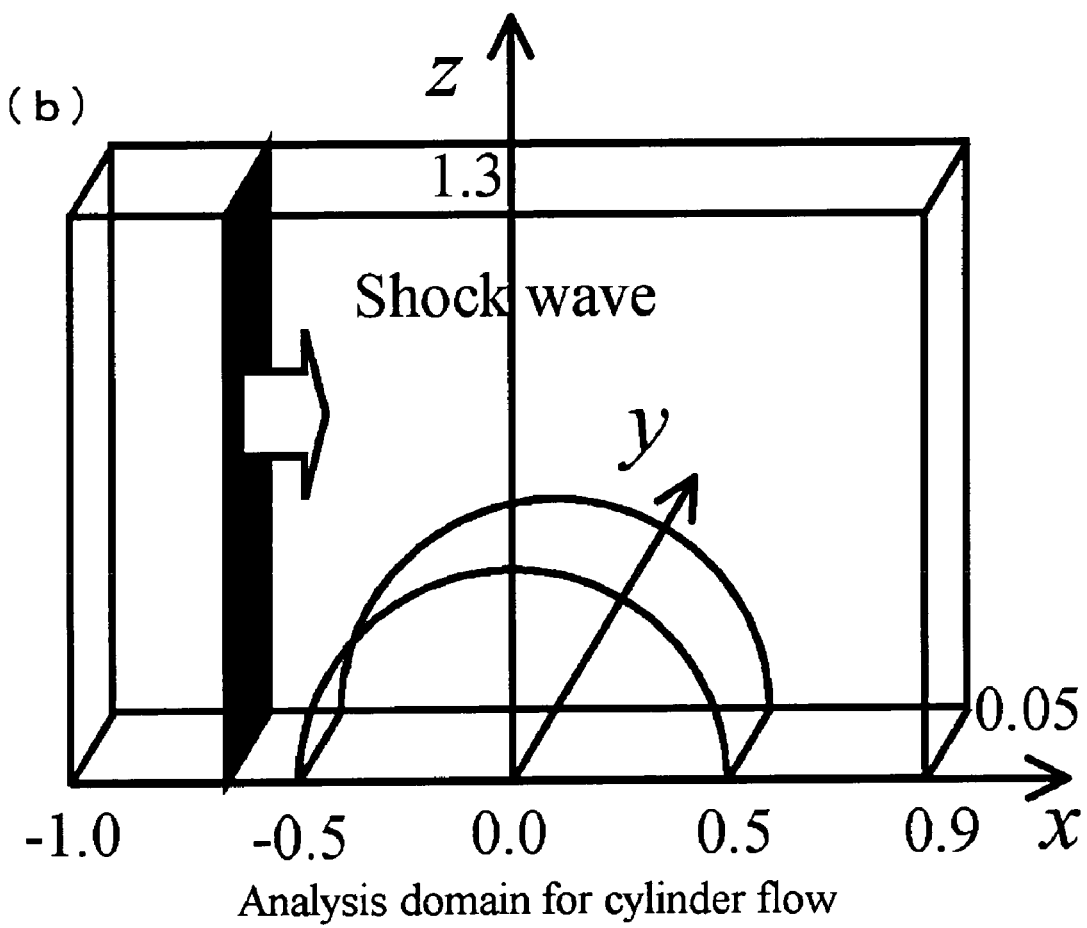
Analysis domain for cylinder flow Figure 11.
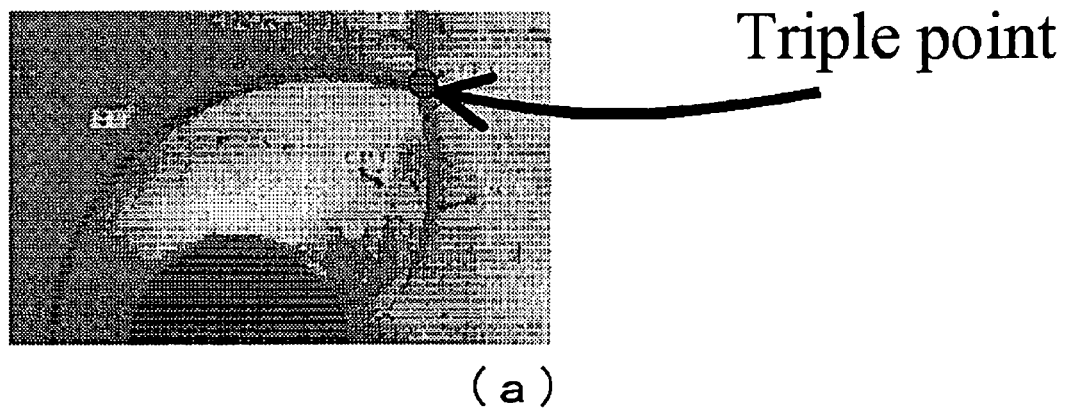
(a)
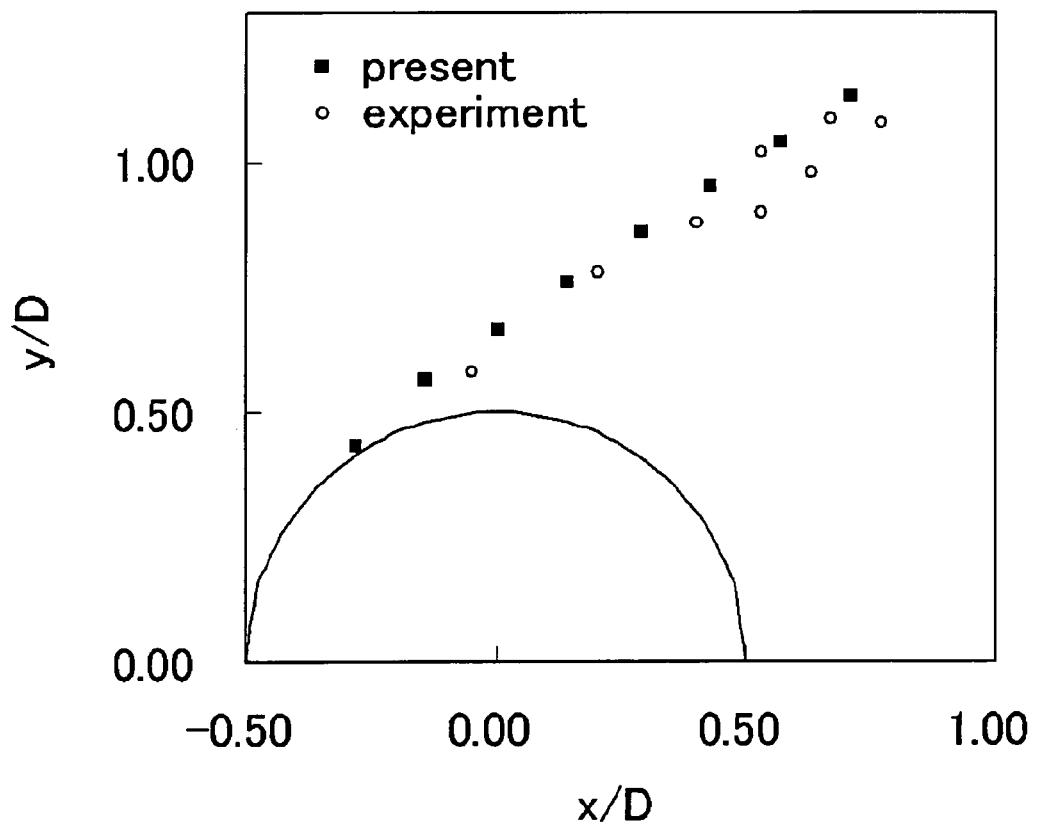
(b) Trajectories of the Mach shock triple point for cylinder flow Figure 12.
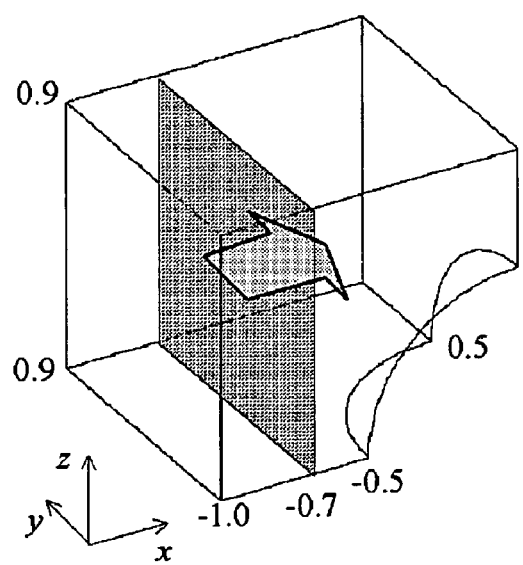
(a) Analysis domain for sphere flow
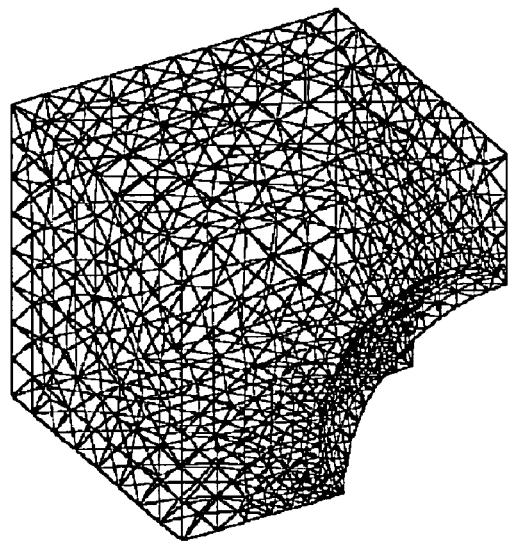
(b) Initial grid
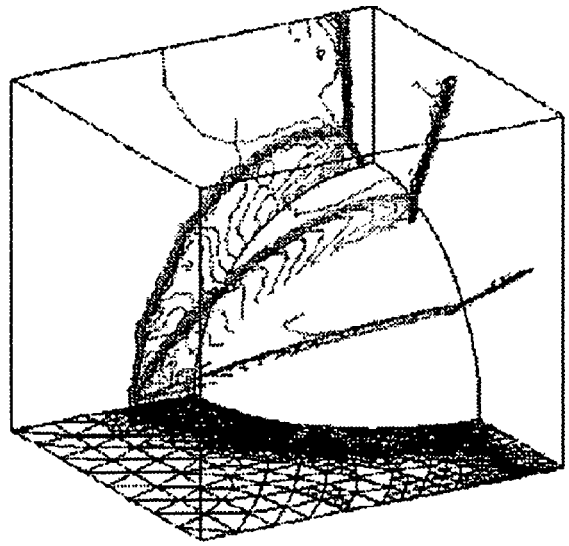
(c) Density contours Figure 13. Analysis domain for Spherically blunted cone-cylinder flow Figure 14
Table 1 : Analysis conditions for Spherically blunted cone-cylinder flow
|  | Case1 | Case2 |
|---|---|---|
| Initial grid | Tetrahedron | Hybrid |
| Adaptive type of Tetrahedral | Type1 | Type2 |
| Mach number | 1.46 | |
| CFL | 0.5 | |
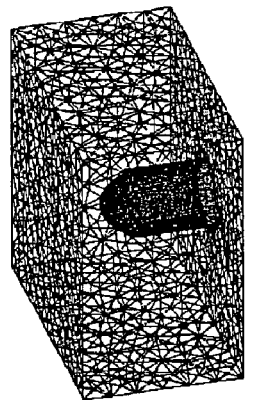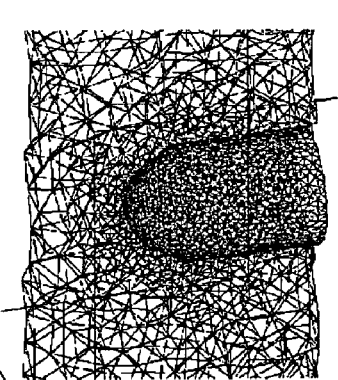
(a) Tetrahedral grid
Tetrahedral grid
38673 cells
7687 nodes
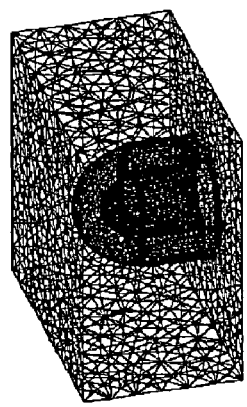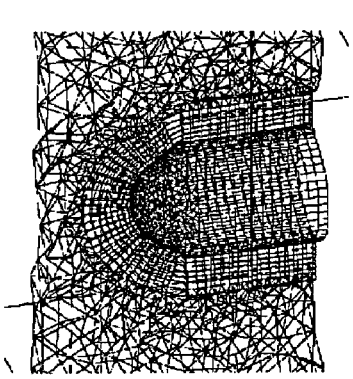
(b) Hybrid grid
Hybrid grid
49839 cells
   Tetrahedron: 35239
   Pyramid: 616
   Prism: 9056
   Hexahedron: 4928
16741 nodes
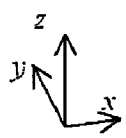
Initial grids for Spherically blunted cone-cylinder flow Figure 15
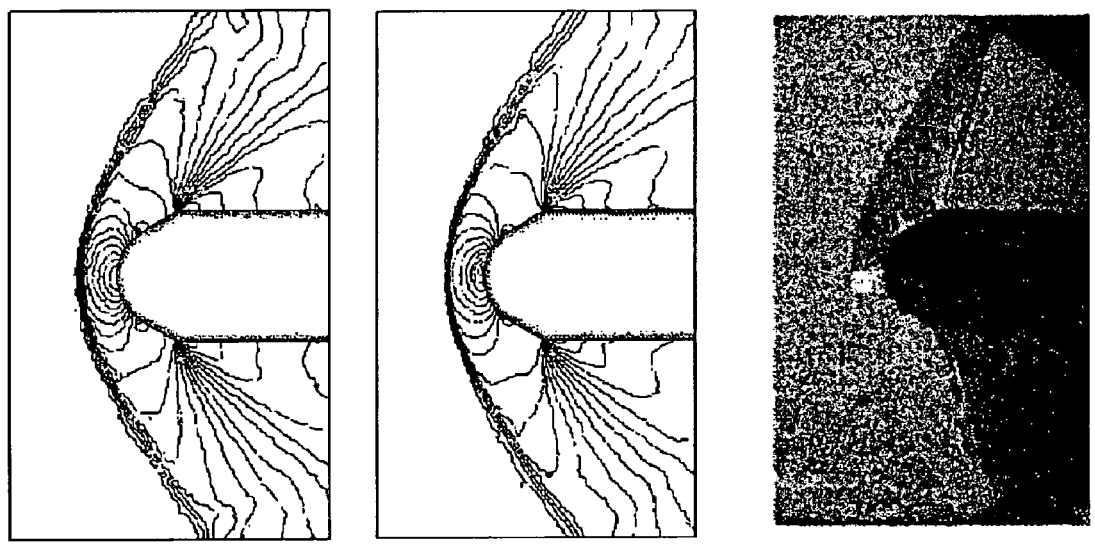
Case 1 (Tetrahedron)   Case 2 (Hybrid)   Experiment
(a) Density contours
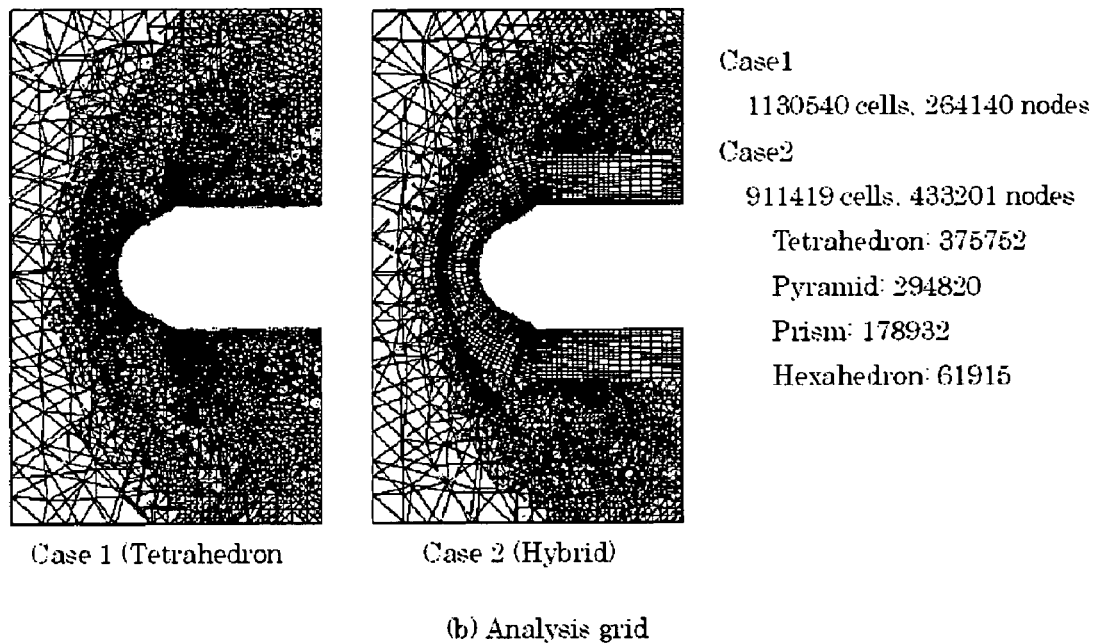
Case 1 (Tetrahedron)   Case 2 (Hybrid)
Case1
   1130540 cells, 264140 nodes
Case2
   911419 cells, 433201 nodes
     Tetrahedron: 375752
     Pyramid: 294820
     Prism: 178932
     Hexahedron: 61915
(b) Analysis grid
Density contours and analysis grid ($y = 0.0$)

Pressure distributions on the spherically blunted cone-cylinder (Comparison between the present and experiment)

NUMERICAL ANALYSIS SYSTEM USING HYBRID GRID ADAPTATION METHOD

FIELD OF THE INVENTION

The present invention relates to the numerical analysis system employing Hybrid Grid Adaptation Method by Finite Volume Method dividing a triangular face of the grid cell into triangular faces and dividing a quadrilateral face of the grid cell into quadrilateral faces.

BACKGROUND OF THE INVENTION

When we analyze the dynamical state of the compressible fluid such as shock waves are arising by the conventional numerical analysis system, we need to calculate the extreme changes of physical quantities (e.g. density, pressure, velocity) if the Mach number is relatively large. The calculation grid (or mesh) of very large number of cells is required in order to calculate very accurately the part showing extreme changes of the physical quantities. But it is not economical to construct a uniform fine grid all over the whole area for analysis because of spending much memory. If the special grid suitable for the problem to be solved is made to save memory, such analysis system is not good for general use. Wide purpose and memory efficiency are important points to build a numerical analysis system.

For all-purpose numerical analysis system, the grid must be easily adaptable to various shapes in the range from simple shape to complex shape of the objects to be analyzed. Triangle has an advantage of freedom to adapt the analyzing grid to the complex-shaped object in the two-dimensional space. Tetrahedral cell and hexahedral cell (e.g. cube) are used for the cell of analyzing grid in three-dimensional space. Tetrahedral cell has an advantage of freedom in the shape of grid cell. The grid of hexahedral cell has an advantage to enable efficient calculation of analysis.

Therefore, it is the best combination for analyzing the problem of complex-shaped object to use the grid of hexahedral cells in the analyzing area as much as possible, and to use the grid of tetrahedral cells only in the area difficult to create the grid. Triangle grid and tetrahedral grid are relatively easy to vary the size of cell in the analyzing area. Triangle grid and Tetrahedral grid enable the analyzing grid to be all-purpose because the high quality grid can be created in the analyzing area in a short time even though the shape of the analyzing object is complex.

For saving memory, the grid is created fine only in the highly varying area of physical quantities. In the static analysis, it is able to create the fine grid only in the area forecast previously to arise shock waves. But in the dynamic analysis, in order to analyze the area where the region of discontinuity of physical quantities is moving such as shock wave, it is necessary to change the fine grid area according to each time.

Therefore, Solution-Adaptive grid is used in the dynamic analysis of shock wave for efficient use of memory. The area where the physical quantities are highly varying such as shock wave area is detected according to the time proceedings, and then the fine cells are concentrated only in that area by dividing and merging cells. In this way, highly accurate analysis is accomplished with the least necessary memory for calculation.

There are p-method, r-method and h-method in the Solution-Adaptive grid. In p-method, the interpolate function in the discontinuous area (area where physical quantities are highly varying) is changed to high degree. In r-method, the cells are concentrated in the discontinuous area. In h-method, the cells are refined in the discontinuous area. And h-method is called Adaptive Mesh Refinement (AMR).

In the analysis to treat discontinuity such as in shock wave, h-method to refine cells is the most effective. In the Adaptive Mesh Refinement, highly accurate analysis is accomplished with the least necessary memory for calculation. The cells are not only refined but also recovered to former cells by deleting and merging unnecessary fine cells. This recovering process is also referred to as coarsening.

There are some examples of conventional analysis method as follows. D. J. Mavriplis disclosed "Adaptive Meshing Techniques for Viscous Flow Calculations on Mixed Element Unstructured Meshes" on "International Journal for Numerical Method in Fluids" of 2000, vol. 34, pp. 93–111. An adaptive refinement strategy based on hierarchical element subdivision is formulated and implemented for meshes containing arbitrary mixtures of tetrahedra, hexahedra, prisms and pyramids. Special attention is given to keeping memory overheads as low as possible. Inviscid flows as well as viscous flows are computed on adaptively refined tetrahedral, hexahedral, and hybrid meshes.

U.S. Pat. No. 6,512,999 disclosed an apparatus for simulating turbulence. The apparatus is for simulating physical processes such as fluid flow. Fluid flow near a boundary or wall of an object is represented by a collection of vortex sheet layers. The layers are composed of a grid or mesh of one or more geometrically shaped space filling elements. The space filling elements take on a triangular shape. An Eulerian approach is employed for the vortex sheets, where a Finite Volume Method is used on the prismatic grid formed by the vortex sheet layers. A Lagrangian approach is employed for the vortical elements found in the remainder of the flow domain. To reduce the computational time, a hairpin removal scheme is employed to reduce the number of vortex filaments.

However, in the conventional analysis method, there is a problem that the efficiency of calculation is low. It is because the shape of the intermediate cell becomes very complex to connect the tetrahedral cell and hexahedral cell. So, there is little freedom in grid generation to create the suitable shape of cell. Then the cell of complex shape cannot raise the efficiency of calculation. The aim of the present invention is that both of the high freedom of grid generation and the high efficiency of calculation should be achieved employing Hybrid Grid Adaptation Method in the numerical analysis system.

In this invention, the numerical analysis system by Finite Volume Method employing Hybrid Grid Adaptation Method is constructed as follows. The initial grid data is made by way of free combination of tetrahedral cells, hexahedral cells and pentahedral cells. A cell is divided into plural cells in order to divide a triangular face of a cell into plural triangular faces and to divide a quadrilateral face of a cell into plural quadrilateral faces. The unnecessary divided cells are recovered to the former cell by deleting daughter cells. The size of the face of the cell is changed but the face shape of the cell is unchanged when the cell is divided. Any combination of various cells does not cause complexity when divided. Therefore, the freedom of grid creation is high. And as the unnecessary fine cells are deleted and recovered to the former large cell, the efficiency of calculation also becomes high.

SUMMARY OF THE INVENTION

In the numerical analysis system of Finite Volume Method employing Hybrid Grid Adaptation Method, the initial grid data are created by way of free combination of tetrahedral cells, hexahedral cells and pentahedral cells. The divide-delete index is calculated according to the density of the fluid in each cell. A cell is divided into plural cells. A triangular face of a cell is divided into plural triangular faces. A quadrilateral face of a cell is divided into plural quadrilateral faces. The cell is divided only when three conditions are satisfied. The first condition is that the volume of the cell is greater than the minimum volume. The second is that the dividing level of the cell is not the maximum level. The third is that the divide-delete index is greater than the dividing threshold. The cell is recovered to the former undivided cell by deleting and merging daughter cells when the dividing level is non-zero (i.e. not the initial cell) and the divide-delete index is less than the deleting threshold. In this numerical analysis system, the freedom of the grid creation is high. Then the suitable cells are easily created and the calculation efficiency becomes high.

BRIEF DESCRIPTION OF THE DRAWINGS

FIG. 3 is the diagram to show the dividing method of cells in the numerical analysis system of the embodiment. FIG. 3(a) is the diagram to show the dividing-by-8 method of a tetrahedron. FIG. 3(b) is the diagram to show the dividing-by-8 method of a hexahedron. FIG. 3(c) is the diagram to show the dividing-by-8 method of a prism. FIG. 3(d) is the diagram to show the dividing-by-10 method of a pyramid into 6 pyramids and 4 tetrahedra. FIG. 3(e) is the diagram to show the dividing-by-8 method and dividing-by-6 method of a tetrahedron.

FIG. 4 is the diagram to show the dividing method of grid boundary faces. FIG. 4(a) is the diagram to show the dividing method of a triangular face. FIG. 4(b) is the diagram to show the dividing method of a tetrahedral face. FIG. 4(c) is the diagram to show the dividing method of the cell whose level difference is zero and the deleting method of the cell whose level difference is one in the two-dimensional space. FIG. 4(d) is the diagram to show the dividing method of the cell whose level difference is one and the deleting method of the cell whose level difference is zero in the two-dimensional space. FIG. 4(e) is the diagram to show the hanging node and the temporary grid. FIG 4(f) shows the family relation.

FIG. 5(a) is the flow chart to show the dividing process. FIG. 5(b) is the flow chart to show the deleting process.

FIG. 6 is the diagram to show the traveling state of shock wave in the shock tube. FIG. 6(a) shows the initial state just before the shock wave begins to travel in the shock tube. FIG. 6(b) shows the result of the analysis of the traveling state of the shock wave. FIGS. 6(c) and (d) show the grid conditions at the state.

FIG. 7 is the diagram to show the analysis result of the traveling state of shock wave in the shock tube. FIG. 7(a) shows the result of the analysis of the traveling state of the shock wave. FIGS. 7(b) and (c) show the grid conditions at the state. FIG. 7(d) shows the analysis grid.

FIG. 8 is the diagram to show the analysis result of the traveling state of shock wave in the shock tube that is constructed of the grid of tetrahedra, prisms, pyramids and hexahedra. FIG. 8(a) shows the result of the analysis of the traveling state of the shock wave. FIGS. 8(b) and (c) show the grid conditions at the state. FIG. 8(d) shows the analysis grid.

FIG. 9(a) shows the initial grid to analyze the unsteady shock wave around the cylinder. FIG. 9(b) shows the traveling state of the shock wave toward the cylinder.

FIG. 11(a) shows the triple point of the shock wave. FIG. 11(b) shows the trajectory of the triple point of the shock wave.

FIG. 12(a) shows the traveling state of the shock wave toward the sphere of one eighth. FIG. 12(b) shows the initial grid to analyze the unsteady shock wave around the sphere of one eighth. FIG. 12(c) shows density contours.

FIG. 14 shows the initial grids for the flow around the spherically blunted cone-cylinder.

FIG. 15 shows the density contours and analysis grid at y=0.0.

DETAIL DESCRIPTION

The invention will be described in detail with reference to the preferred embodiments illustrated in FIGS. 1~12. The first embodiment of the present invention is the numerical analysis system to analyze the shock tube problem. Tetrahedral cells, hexahedral cells and pentahedral cells are used. A cell is divided into plural cells as to divide a triangular face into plural triangular faces and to divide a quadrilateral face into plural quadrilateral faces when the divide-delete index is greater than the dividing threshold. The cells are recovered to undivided cells by deleting cells when the divide-delete index is less than the deleting threshold.

Figure 1:
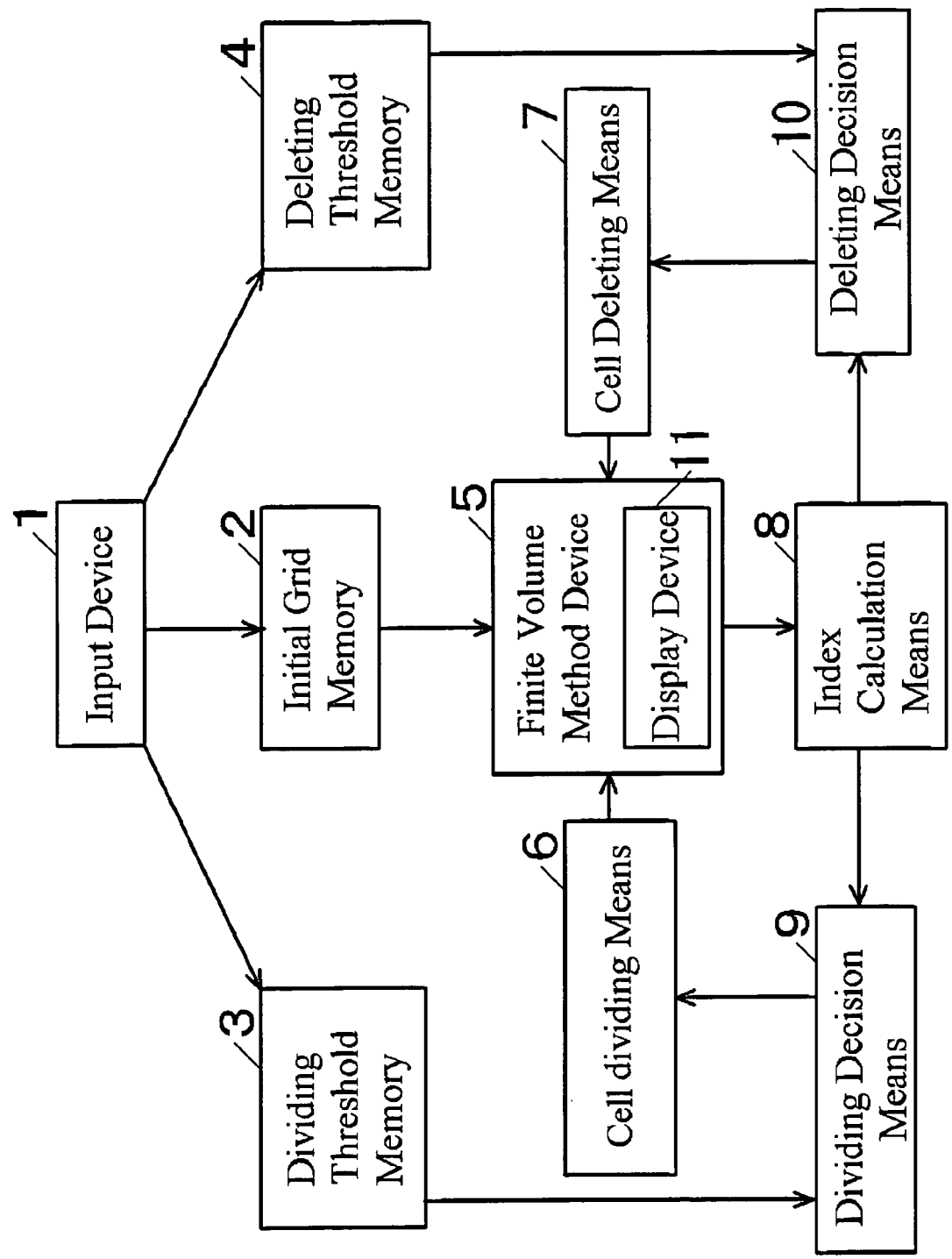
FIG. 1 shows the functional block diagram of the numerical analysis system of the preferred embodiment of the present invention.

FIG. 1 is the functional block diagram of the numerical analysis system of the first embodiment of this invention. In FIG. 1, the input device 1 is the means to input various data and parameters such as initial grid data, dividing threshold data, deleting threshold data and physical quantities. Initial grid memory 2 is the memory to contain the initial data of the grid. The dividing threshold memory 3 is the memory to contain the criteria data to decide the division of a cell. The deleting threshold memory 4 is the memory to contain the criteria data to decide the deletion of a cell. The Finite Volume Method (FVM) device 5 is the means to perform the numerical analysis by Finite Volume Method.

The cell dividing means 6 is the means to divide a cell of the grid. The cell deleting means 7 is the means to recover the original size of the cell by deleting and merging divided cells. The index calculating means 8 is the means to calculate the index depending upon the physical quantities such as density. The division deciding means 9 is the means to compare the dividing threshold with the divide-delete index. The deletion deciding means 10 is the means to compare the deleting threshold with the divide-delete index. The display device 11 is the means to display the result of the numerical analysis.

First, referring to FIG. 1, the outline of the working of the numerical analysis system is explained. The basic structure of the numerical analysis system is the same as the conventional system. The initial grid data, dividing threshold data, deleting threshold data and physical quantities are taken through the input device 1. The initial grid data are held in the initial grid memory 2. The criterion data of grid division are held in the dividing threshold memory 3. The criterion data of grid deletion are held in the deleting threshold memory 4. According to these data, the Finite Volume Method device 5 performs numerical analysis by Finite Volume Method.

The index calculation means 8 performs the calculation of index according to the physical quantities such as density. The division deciding means 9 compares the index with the dividing threshold. The deletion deciding means 10 compares the index with the deleting threshold. If the index is greater than the dividing threshold, the cell dividing means 6 divides the cell of the grid. If the index is less than the deleting threshold, the cell deleting means 7 recovers the cell to the former size by deleting and merging the cells. The numerical analysis is performed repeating these processes. The result of the numerical analysis is displayed on the display device 11.

Figure 2:
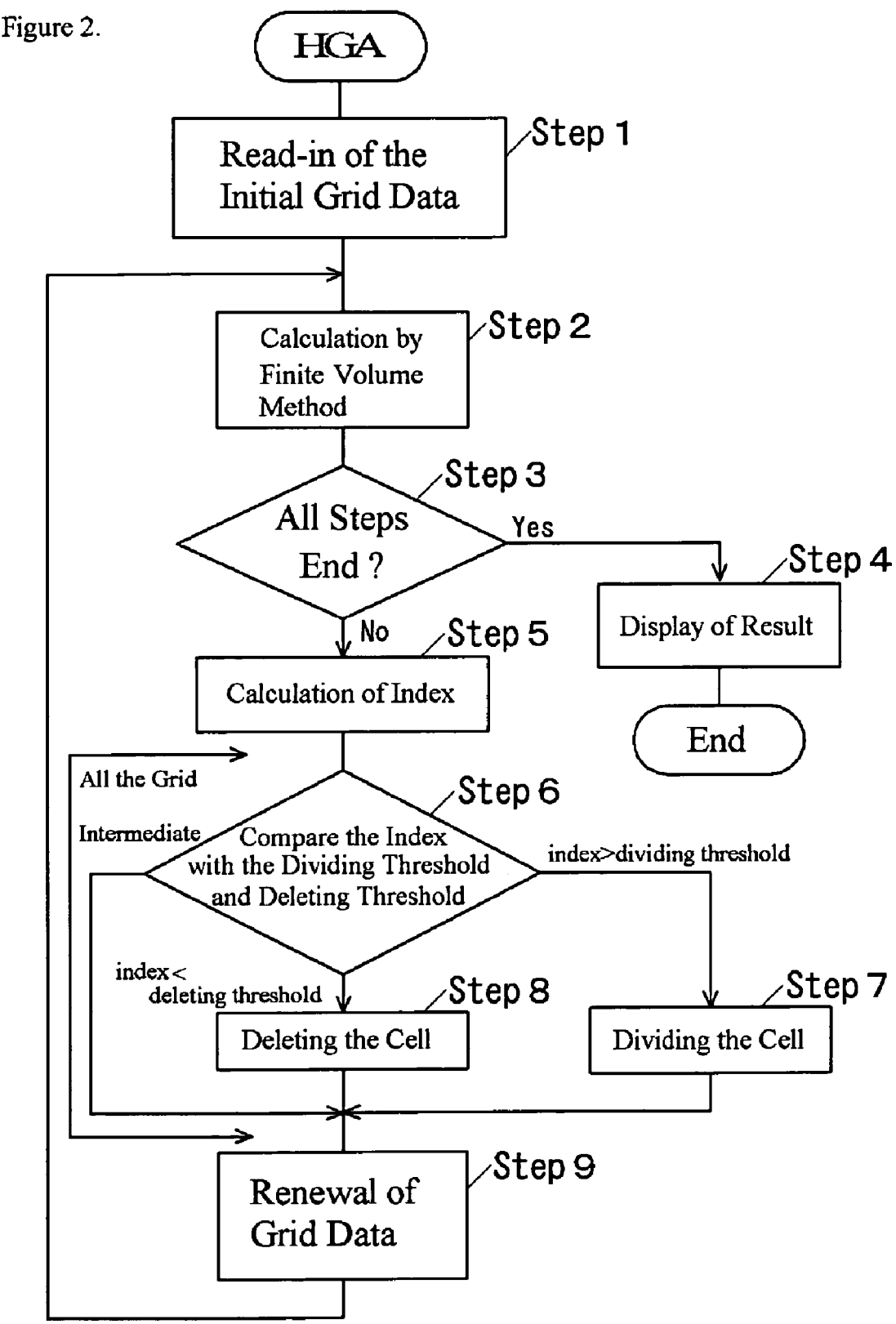
FIG. 2 is the flow chart to show the processing steps of the numerical analysis system.

Second, referring to FIG. 2, the outline of the working process of the numerical analysis system is explained. In the step 1, the FVM device 5 reads the initial grid data in the initial grid memory 2. In the step 2, the FVM computation is performed. One step of the FVM computation is performed at one step of time proceeding. The grid is renewed at every 10 time-steps. Then, the FVM computation is performed 10 times in the step 2. But the number of the time unit in one cycle of the FVM computations may be only one or other numbers according to the problem.

In the step 3, it is examined whether calculations of all the time units are completed. If completed, in the step 4, the result is displayed and the processing is terminated. If not completed, in the step 5, the index is calculated.

In the step 6, the index is compared with the dividing threshold. If the index is greater than the dividing threshold, the cell is divided in the step 7. The index is compared with the deleting threshold. If the index is less than the deleting threshold, the cell is deleted in the step 8. If the index is between the dividing threshold and the deleting threshold, cell is neither divided nor deleted. All the cells of the grid are processed, and then the grid data are updated. Returning to the step 2, the FVM calculation is performed again.

Third, the detailed working of the numerical analysis system is explained here. The h-method of refining grid is applied to the hybrid grid. That is, Hybrid Grid Adaptation (HGA) is applied. The main processes of HGA are following procedures:
(1) The calculation of divide-delete index
(2) The division of cells
(3) The deletion of cells The index of each cell is calculated before the decision of dividing or deleting of the cell. If the index of the result of the calculation is greater than the dividing threshold, the cell is divided. If the index is less than the deleting threshold, the cell is deleted. If the index is between the deleting threshold and the dividing threshold, the cell is left behind. The maximal dividing level is decided previously. If the dividing level of the cell is the maximum, the cell is not divided. Moreover, when the volume of the cell is less than the minimal cell volume, even if the dividing level of the cell is not the maximum, the cell is not divided.

It can be prevented that the cell around the object is divided too fine beyond the necessity by controlling the volume of the cell. Conversely, the cells of which dividing level is zero (i.e. initial cells) are not deleted. Density is used for the index value to detect the shock wave or the discontinuous plane. In this case, the method of M. Delanaye is used for the calculation of the index value (or error indicator). Of course, other index value can be used because it affects only the marking method of division or deletion of cells.

Fourth, referring to FIG. 3 and FIG. 4, the method how to divide the cells of the grid is explained. In the present invention, the mixed grid of the tetrahedral grid (grid of tetrahedra), which has a high freedom of grid shape, and the hexahedral grid (grid of hexahedra), which has a good efficiency of calculation, and pentahedral grid (grid of pentahedra) are used. That is, when the initial grid is created, the hexahedral grid is used in the restriction-less part of shape such as the planar boundary, and the tetrahedral grid is used in the part of complicated shape such as curved boundary. Therefore, the freedom of adaptation of grid shape and the efficiency of calculation are both high. However, as the shape of boundary of tetrahedral grid is triangle, and the shape of boundary of hexahedral grid is quadrilateral, either cannot be connected simply. So, they are connected with the pentahedral cell (square pyramid or triangular prism) that has both triangular and quadrilateral faces.

Though there are various methods in the way of dividing a cell, the cells are divided as shown in FIG. 3 in the present invention. FIG. 3(*a*) shows how to divide simply a tetrahedron into eight tetrahedra. FIG. 3(*b*) shows how to divide a hexahedron into eight hexahedra. FIG. 3(*c*) shows how to divide a prism into eight prisms. These are simple dividing-by-8 methods. FIG. 3(*d*) shows how to divide a pyramid into six pyramids and four tetrahedra. FIG. 3(*e*) shows two kinds of methods to divide a tetrahedron. One is to divide a tetrahedron into eight tetrahedra, and another is to divide a tetrahedron into four tetrahedra and two pyramids. When division-by-8 is repeated 4 times, one cell becomes 4096 cells. When division-by-6 is repeated 4 times, one cell becomes 2448 cells. It is possible to choose suitable one for the problem out of two dividing methods.

Dividing in this way, a triangular face of the grid boundary is divided into four triangles as shown in FIG. 4(*a*). The quadrilateral face is divided into four quadrilateral faces as shown in FIG. 4(*b*). In this way, handling of the boundary of the grid becomes comparatively easy and the complication of the program can be prevented.

By the way, when AMR (Adaptive Mesh Refinement) is used, a hanging node (the node shown by the white circle in FIG. 4(*e*)) is formed between the divide (deleted) cell and its adjoining cell. As the hanging node disables the calculation of Finite Element Method, the temporary cell to fill the hanging node is needed. The temporary cell is called a transient grid (the cell shown by hatching in FIG. 4(*e*)). But the shape of the transient grid tends to be distorted easily. Therefore, such problems are arising as the calculation becomes unstable or the program becomes complex. So, this difficulty is avoided by using the calculation technique based upon the Finite Volume Method (FVM). In FVM, adjusting the number of boundary surfaces, current is evaluated and the calculation can be done. As it is needless to use the transient grid, those difficulties are dissolved.

Figure 5:
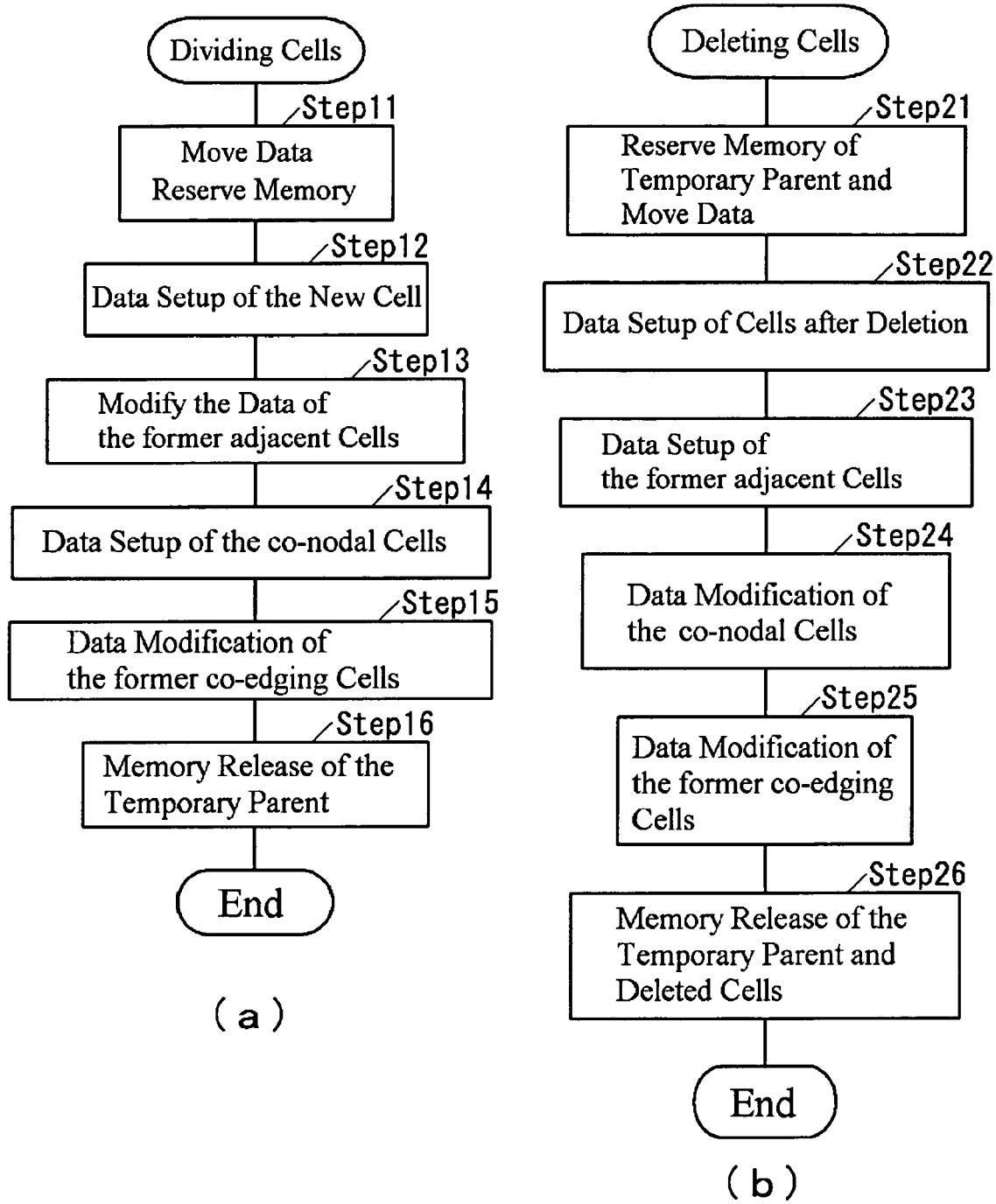
FIG. 5 shows two flow charts of the dividing steps and deleting steps of the numerical analysis system.

Referring to FIG. 5(*a*), the dividing process of the cell is explained concretely. Before the division of the cell, remarking of the cell is done according to the information of the regarding cell and the adjoining cell (the cell which shares a face, an edge or a node). This work is repeated recursively until the difference of the dividing levels between the regarding cell and the adjoining cell becomes less than or equal to 1. In other words, the number of the hanging node on one edge of the cell is restricted utmost one. After that, the dividing process is carried out corresponding to the shape of each grid.

In the step 11, the data are moved and the memory is reserved. The cell information before dividing is shifted to the temporary parent cell (temporary memory). Then, the memory is reserved for the new nodes and the new cells. In the step 12, the data of the new cells are set up. The memory for the nodes of the new cells created by division and their adjoining cells is reserved and the data of the physical quantities are set up in the memory. The way to set up the data in the memory is to set up the same data of the physical quantities of the cells as it was before the division. Furthermore, family relations are decided.

Referring to FIG. 4(*f*), to make it easy to understand, the sample of triangle grid in two-dimensional space is explained. One of the same shaped cells as before the division is selected as the parent cell. For example, the triangle on the bottom left of the central figure of FIG. 4(*f*) is selected as the parent cell. The parent cell of the selected cell as the parent cell is that cell itself. A brother cell is the cell created together by the division. A cell remembers one brother cell. The family relation data are expressed by the one-dimensional array and are set up in every dividing level. The entry value of the array is 0 when no parents and no brothers exist.

In the step 13, the information on the cells adjacent to the cell before the division is modified. The data on the nodes of the adjoining cells, the data on the adjoining cells and the data of the number of the boundary faces of the cells are modified. When the difference of the dividing levels between the cell and the adjoining cell is zero (as shown in FIG. 4(*c*)), the data on the nodes of the cells, the data on the adjoining cells and the data of the number of the boundary faces of the cells are modified. When the difference in level is 1 (as show in FIG. 4(*d*)), only the data on the adjoining cell are modified. And the function corresponding to each cell shape is carried out.

In the step 14, the data of the cells, which share a node, are set up and modified. The data of the cells, which share the existent node and the new node created by cell division, are set up and modified. In the step 15, the data of the cells, which share the edge with the cells before division, are modified. The cells, which share a node, are searched, the new node is added to the cell data and the data of the cell are modified. In the step 16, the memory of the temporary parent is released.

Fifth, referring to FIG. 5(*b*), the method to delete a cell is explained. The method to delete a cell is the reverse of the method to divide a cell. The deletion of the cell is carried out when the division levels of the parent cell and those all brother cells are the same and the deletion marks are settled in the parent cell and those all brother cells. In the step 21, the memory for the temporary parent is reserved and the data are moved. The data on the parent cell before the deletion are moved to the temporary parent cell. In the step 22, the data of the cell after the deletion is set up.

The data of the cell after the deletion and the data of the adjoining cell are set up. And the physical quantities are given to the cells after the deletion according to this equation.

$$q=(q_1'V_1+q_2'V_2+\ldots+q_N'V_N)/(V_1+V_2+\ldots+V_N)$$

where q' is the physical quantity before the deletion, V is the volume of the cell before the deletion, N is the number of the cells merged into one cell by deletion. N is 8 in principle, but N becomes 10 and 6 in the case shown in FIGS. 3(*d*) and 3(*e*), respectively.

In the step 23, the data of the cell once adjacent to the deleted cell is modified. When the level difference with the adjoining cell is 1 (as show in FIG. 4(*d*)), the data of the cell, the data of the adjoining cell and the data of the number of the boundary faces of the cells are modified. Only the data of the adjoining cells are modified when the level difference is 0 (as shown in FIG. 4(*c*)). In the step 24, the data of the adjoining cells with shared nodes are modified. According to the deletion of the cells, the data of the adjoining cells of the node of the deleted cells are modified.

In the step 25, the data of the adjoining cells sharing with the edges of the deleted cells are modified. The cells sharing a node are searched and the data of the cell are modified deciding to delete the shared node or not in consideration of the level difference. The memory of the node is released when the node is deleted. In the step 26, the memory of the temporary parent is released and the memory of the deleted cells.

The method how to number the array of the new cells and new nodes created by the division of the cells is explained. The minimum array number is required with re-use of the free array numbers used by the deleted cells or nodes for the new array numbers of the created cells and nodes by division. But it takes enormous time to search the free array numbers. Therefore, the largest array number is reserved so far as the using computer permits. The new array numbers are consumed freely for the necessary new arrays by the division. The array numbers are re-used when the maximum array number is consumed out. In this way, HGA Method can be carried out very fast until the maximum array number is used.

Referring to FIGS. 6, 7 and 8, the example to analyze the state of the shock wave traveling in the shock tube is explained. FIG. 6(*a*) shows the initial state just before the shock wave begins to travel in the shock tube. The direction along the longer edge of the straight tube with a rectangular section is the x-axis. The vertical direction of the section is the z-axis and the horizontal direction is the y-axis. There is the high-pressure and high-density fluid in the region of x=0.0~1.0. The density is 1.0, the speed is 0 and the pressure is 1.0. There is the low-pressure and low-density fluid in the region of x=1.0~2.0. The density is 0.125, the speed is 0 and the pressure is 0.1. The units of these values are dimensionless as normalized by arbitrary unit value.

FIG. 6(*b*) shows the result of the analysis of the traveling state of the shock wave to x=1.05 (t=0.28) in the shock tube consisted of the grid of pyramidal cells. Each distribution of the speed, the density and the pressure is shown. The solid line shows the exact solution. FIGS. 6(*c*) and (*d*) show the grid conditions at the state. The division threshold is 0.15 and the deleting threshold is 0.10. The maximal dividing level is 3. The number of the cells is 18656 and the number of the nodes is 7475.

FIG. 7(*a*) shows the result of the analysis of the traveling state of the shock wave to x=1.05 in the shock tube. FIGS.

7(*b*) and (*c*) show the grid conditions at the state. The initial grid is constructed with the tetrahedra, the pyramids and the hexahedra as shown in FIG. 7(*c*). The dividing threshold is 0.10 and the deleting threshold is 0.05. The maximal dividing level is 3. The number of the cells is 25215 and the number of the nodes is 11266.

FIG. 8(*a*) shows the result of the analysis of the traveling state of the shock wave to x=1.05 in the shock tube. FIGS. 8(*b*) and (*c*) show the grid conditions at the state. The initial grid is constructed with the tetrahedra, the triangular prism, the pyramids and hexahedra as shown in FIG. 8(*c*). The dividing threshold is 0.10 and the deleting threshold is 0.08. The maximal dividing level is 3. The number of the cells is 20679 and the number of the nodes is 9083.

In the first embodiment of the present invention, the numerical analysis system to analyze the shock wave traveling in the shock tube is constructed by employing the method to divide a cell into plural cells as to divide a triangular face into plural triangular faces and to divide a quadrilateral face into plural quadrilateral faces when the divide-delete index is greater than the dividing threshold, and to recover undivided cell by deleting cells when the divide-delete index is less than the deleting threshold, using tetrahedral cells, hexahedral cells and pentahedral cells, therefore both of the freedom of the grid creation and the efficiency of the calculation are satisfied well.

The second embodiment of the present invention is the numerical analysis system to analyze the unsteady shock wave around the cylinder. The basic structure of the numerical analysis system of the second embodiment of the present invention is the same as the first embodiment of the present invention.

FIG. 9(*a*) shows the initial grid to analyze the unsteady shock wave around the cylinder. The grid of the neighborhood of the cylinder is formed with the cells of triangular prisms. The grid outside of that area is formed with hexahedral cells. FIG. 9(*b*) shows the traveling state of the shock wave toward the cylinder. The number of the cells of the initial grid is 1004. The number of the nodes of the initial grid is 1794. The Courant number is 0.2. The Mach number is 2.81. The HGA period is the length of 10 steps. The dividing threshold is 0.25. The deleting threshold is 0.23. The maximum division level is 3.

Figure 10:
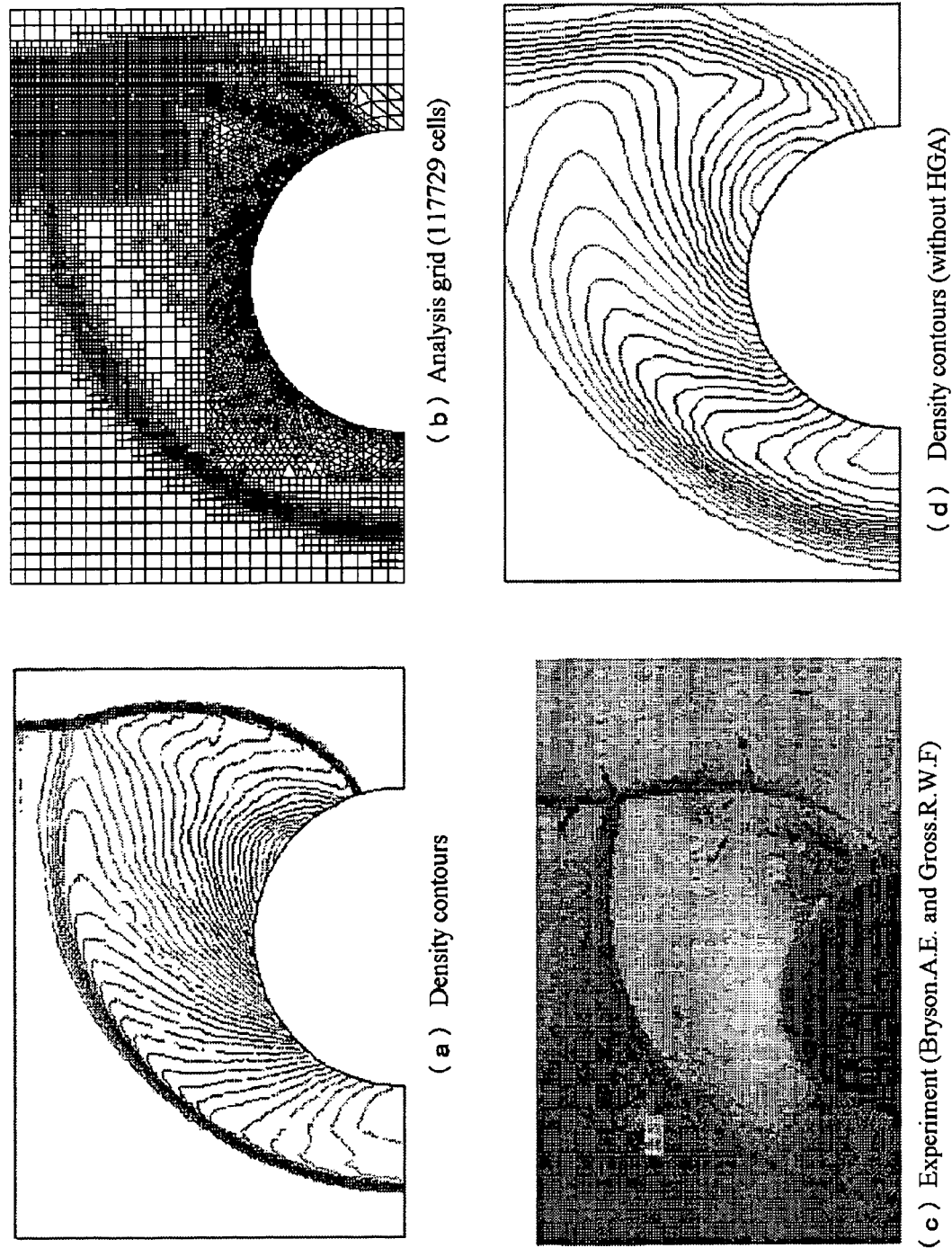
FIG. 10(a) shows the density contours of the analytic result.
FIG. 10(b) shows the division state of the analytic grid.
FIG. 10(c) shows the experimental result.
FIG. 10(d) shows the density contours of the analytic result without HGA.

FIG. 10(*a*) shows the density contours of the analytic result. FIG. 10(*b*) shows the division state of the analytic grid. The grid is divided into 117729 cells. FIG. 10(*c*) shows the experimental result. FIG. 10(*d*) shows the density contours of the analytic result without HGA. FIG. 11(*a*) shows the triple point of the shock wave. FIG. 11(*b*) shows the trajectory of the triple point of the shock wave.

The analytic result shown in FIG. 10(*a*) corresponds well to the experimental result shown in FIG. 10(*c*). As shown in FIG. 10(*b*), the grid of the steep density gradient is refined. The large effect of HGA is shown in FIG. 10(*a*) compared with FIG. 10(*d*). As shown in FIG. 11(*b*), the trajectory of the triple point of the shock wave-shown in FIG. 11(*a*) corresponds very well to the experimental result. The triple point of the shock wave is the point where the traveling shock wave front, the reflected shock wave front and the Mach stem are intersecting with each other.

In the second embodiment of the present invention, the numerical analysis system to analyze the unsteady shock wave around the cylinder is constructed by employing the method to divide a cell into plural cells as to divide a triangular face into plural triangular faces and to divide a quadrilateral face into plural quadrilateral faces when the divide-delete index is greater than the dividing threshold, and to recover undivided cell by deleting cells when the divide-delete index is less than the deleting threshold, using hexahedral cells and pentahedral cells, therefore both of the freedom of the grid creation and the efficiency of the calculation are satisfied well when the unsteady shock wave around the cylinder is analyzed.

The third embodiment of the present invention is the numerical analysis system to analyze the unsteady shock wave around the sphere of one eighth. The basic structure of the numerical analysis system of the third embodiment of the present invention is the same as the first embodiment of the present invention.

FIG. 12(*a*) shows the traveling state of the shock wave toward the sphere of one eighth. FIG. 12(*b*) shows the initial grid to analyze the unsteady shock wave around the sphere of one eighth using in the third embodiment of the present invention. The grid is consisted of 6642 tetrahedra and 1465 nodes. Courant number is 0.2. The Mach number is 2.00. The HGA period is the length of 10 steps. The dividing threshold is 0.3. The deleting threshold is 0.25. The maximum division level is 3. The minimum volume of the cell is $3.5 \times 10^{-7}$.

In Type 1, one tetrahedron is divided into 8 tetrahedra. In Type 2, one tetrahedron is divided into four tetrahedra and two pyramids. FIG. 12(*c*) shows the density contours of the analytic result of Type 1. The grid is divided into 559243 cells and the number of the nodes is 133286. The grid of Type 2 is divided into 409969 cells and the number of the nodes is 141368. The density contours of the analytic result of Type 2 are almost the same as shown in FIG. 12(*c*). That is, the calculation on the Hybrid grid enables the analysis with the small memory.

The example of shock wave analysis of the flow around the spherically blunted cone-cylinder is explained here. In order to verify that this invention is valid to analyze the shock wave in the three-dimensional space, the shock wave around the spherically blunted cone-cylinder, which is widely used as the head of flying object as rocket and so on, is analyzed.

Figure 13:
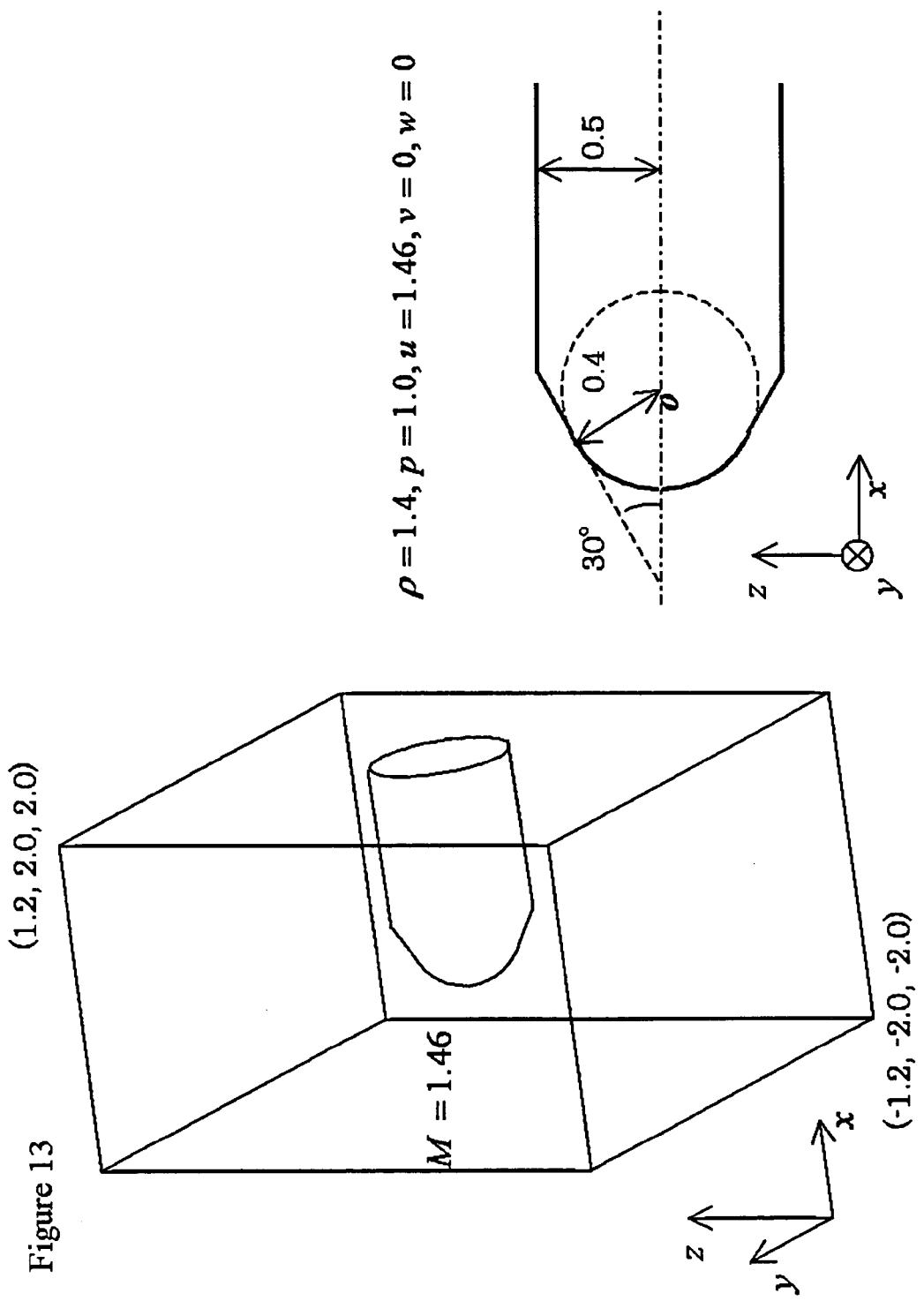
FIG. 13 shows the analysis domain for the flow around the spherically blunted cone-cylinder.

The analysis domain for the flow around the spherically blunted cone-cylinder is shown in FIG. 13. In this case, the origin of the coordinate is the center of the sphere. As the initial grids, two kinds of grids, tetrahedral grid and hybrid grid as shown in FIG. 14, are used. In the hybrid grid, prism elements are used around the spherically blunted cone, hexahedral cells are used around the cylinder, tetrahedral cells are used in the other region and pyramid cells are used between hexahedral cells and tetrahedral cells.

The analytic result by using hybrid grids is compared with the experimental result. In order to verify the HGA Method is valid, the experimental result is compared with the analytic result by using the tetrahedral grid as the sample of the conventional analyzing method. As the initial condition, the Mach number of the uniform flow is given to be 1.46. The computation is continued until the state becomes stationary. The working fluid is air. The ratio of the specific heat is 1.4. The details of the analytic conditions are shown in Table 1 in FIG. 14.

Figure 16A:
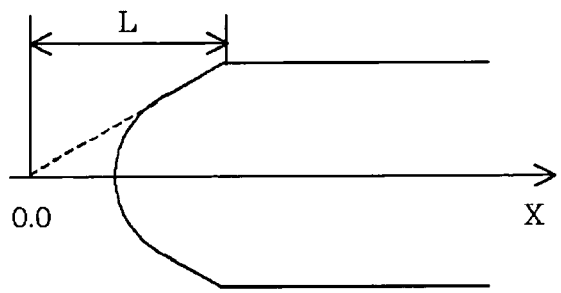
FIG. 16 shows the pressure distributions on the spherically blunted cone-cylinder comparing the analytic result of the present invention with the experimental result.
Figure 16B:
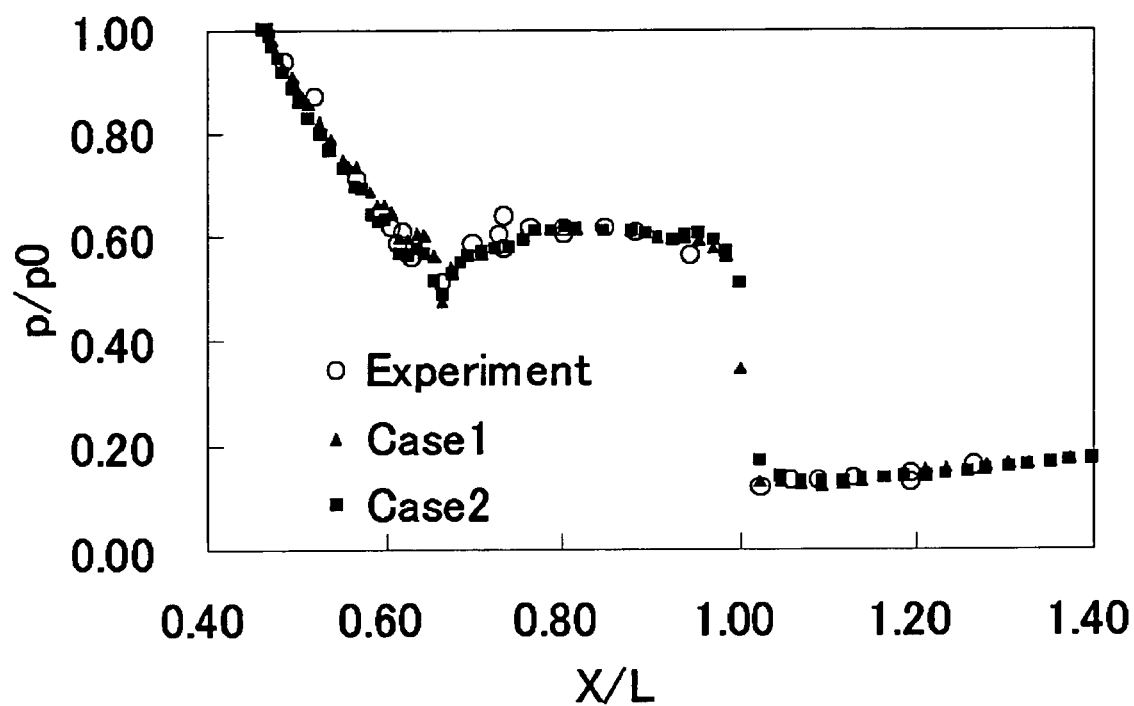

FIG. 15 shows the density contours at y=0.0, the analysis grid and experimental result. The experimental result is obtained by Nakamori et al. as shown in the Japanese Journal of the Japan Society for Aeronautical and Space Sciences, 44–510(1996), pp. 416–422. FIG. 16 shows the pressure distributions on the spherically blunted cone-cylinder. It is the comparison between the result of the present invention and the experimental result. The pressure unit is non-dimensional, normalized by the pressure at p0 of the stagnation point. As shown in FIGS. 15 and 16, the analytic result of this invention quite agrees with the experimental result. The flow is over-expanded at the border between the sphere and the cone. A weak shock wave arises slightly after the front end of the cone. The flow speed is sub-sonic at the surface of the cone to the front end of the cylinder. This weak shock wave is recognized because the pressure is rising near the point of X/L=0.7 as shown in FIG. 16. And also, it is observed in FIG. 15 that the HGA Method is working well.

Comparing the numbers of cells, the initial cell number in Case 2 is greater than that in Case 1. But, in FIG. 15, the cell number in Case 2 is less than that in Case 1. From this fact, it is known that the computing memory is saved. The reason why the cell number in Case 2 is less than that in Case 1 is considered that Type 2 method is employed as the dividing method of the tetrahedral cells. The result of higher resolution can be obtained with small number cells by using the hybrid grid consisted of prism cells and hexahedral cells of high computational efficiency around the spherically blunted cone-cylinder.

In the third embodiment of the present invention, the numerical analysis system to analyze the unsteady shock wave around the sphere of one eighth is constructed by employing the method to divide a cell into plural cells as to divide a triangular face into plural triangular faces and to divide a quadrilateral face into plural quadrilateral faces when the divide-delete index is greater than the dividing threshold, and to recover undivided cell by deleting cells when the divide-delete index is less than the deleting threshold, using tetrahedral cells in the type 1 and using tetrahedral cells and pyramidal cells in Type 2, therefore both of the freedom of the grid creation and the efficiency of the calculation are satisfied well when the unsteady shock wave around the sphere of one eighth is analyzed.

The numerical analysis system of the present invention by Finite Volume Method employing Hybrid Grid Adaptation Method has the following advantages. As the initial grid data are made by way of free combination of tetrahedral cells, hexahedral cells and pentahedral cells, the freedom of grid creation is high. As a triangular face of a cell is divided into plural triangular faces and a quadrilateral face of a cell is divided into plural quadrilateral faces, it is easy to refine the grid of necessary area to be analyzed precisely. As the unnecessary divided cells are deleted and recovered to the former large cell, the calculation memory can be saved and the efficiency of calculation is high.

What is claimed is:

1. A numerical analysis system for performing numerical analysis by Finite Volume Method employing Hybrid Grid Adaptation Method, for analyzing physical quantities data of continuum medium, comprising:
   (a) an initial grid memory containing an initial grid data including the physical measurement data made by way of free combination of tetrahedral cells, hexahedral cells and pentahedral cells;
   (b) a grid dividing adapted means for dividing a cell into plural cells in order to divide a triangular face of a cell into plural triangular faces and divide a quadrilateral face of a cell into plural quadrilateral faces; and
   (c) a grid deleting means recovering the former undivided cell by deleting divided cells,
   said system thereby providing a modified grid data adapted for more efficient calculation and memory usage in analysis of said physical quantities data of said continuum medium.

2. The numerical analysis system of claim 1, wherein said grid deleting means comprising:
   (c1) a dividing threshold memory containing the dividing threshold;
   (c2) a deleting threshold memory containing the deleting threshold;
   (c3) a computing means to compute the divide-delete index depending upon the density in each cell;
   (c4) a division deciding means deciding to divide the cell when the volume of the cell is greater than the minimum and when the division level of the cell is not maximal and when the divide-delete index is greater than the dividing threshold; and
   (c5) a deletion deciding means deciding to delete the cell when the cell is not the initial cell of zero division level and when the divide-delete index is less than the deleting threshold.

3. The numerical analysis system of claim 1, wherein said grid dividing means comprising:
   (b1) a prism dividing means dividing a prismatic cell into 8 prismatic cells;
   (b2) a hexahedron dividing means dividing a hexahedral cell into 8 hexahedral cells;
   (b3) a pyramid dividing means dividing a pyramidal cell into 6 pyramidal cells and 4 tetrahedral cells;
   (b4) a simple tetrahedron dividing means dividing a tetrahedral cell into 8 tetrahedral cells; and
   (b5) a tetrahedron dividing means dividing a tetrahedral cell into 4 tetrahedral cells and 2 pyramidal cells.

4. A numerical analysis method processing numerical analysis by Finite Volume Method employing Hybrid Grid Adaptation Method, for analyzing grid data including physical quantities data of continuum medium, comprising:
   (a) an initial FVM processing step to calculate the quantity including density of the continuum medium by Finite Volume Method depending upon the initial grid data made by using tetrahedral cells, hexahedral cells and pentahedral cells;
   (b) an index processing step to calculate the divide-delete index of each cell depending upon the calculated density;
   (c) a division processing step to divide a cell into plural cells in order to divide a triangular face into plural triangular faces and to divide a tetrahedral face into plural tetrahedral faces when the volume of the cell is greater than minimum and when the division level of the cell is not maximum and when the divide-delete index is greater than the division threshold;
   (d) a deletion processing step to recover the undivided cell by deleting such cells that the cell is not the initial cell of zero dividing level and the divide-delete index is less than the deleting threshold;
   (e) a renewal processing step to create the next grid;
   (f) an FVM processing step to calculate the physical quantities including the density of the continuum medium by Finite Volume Method depending upon those grid data; and
   (g) a repeating step to repeat those steps of (b) to (f),
   thereby providing a modified grid data adapted for more efficient calculation and memory usage in analysis of said physical quantities data of said continuum medium.

5. The numerical analysis method of claim 4, wherein a prismatic cell is divided into 8 prismatic cells, a hexahedral cell is divided into 8 hexahedral cells, a tetrahedral cell is divided into 6 pyramidal cells and 4 tetrahedral cells, a tetrahedral cell is divided into 8 tetrahedral cells or into 4 tetrahedral cells and 2 pyramidal cells.

6. The numerical analysis method of claim 4, wherein said continuum medium comprises a fluid.

7. The numerical analysis method of claim 4, wherein said data of continuum medium comprises a shock wave data of a fluid.

8. The numerical analysis method of claim 4, wherein said continuum medium comprises a compressible fluid.

9. The numerical analysis method of claim 4, wherein said data of continuum medium comprises a shock wave data of a compressible fluid.

10. The numerical analysis system of claim 1, wherein said continuum medium comprises a fluid.

11. The numerical analysis system of claim 1, wherein said continuum medium comprises a compressible fluid.

12. The numerical analysis system of claim 1, wherein said data of continuum medium comprises a shock wave data of a fluid.

13. The numerical analysis system of claim 1, wherein said data of continuum medium comprises a shock wave data of a compressible fluid.

* * * * *